United States Patent [19]

Kanoh et al.

[11] Patent Number: 4,554,209

[45] Date of Patent: Nov. 19, 1985

[54] CORROSION INHIBITING COATING COMPRISING LAYER OF ORGANIC CORROSION INHIBITOR AND LAYER OF FLUORIDIZED ACRYLATE

[75] Inventors: Osamu Kanoh; Atsuo Senda, both of Kyoto, Japan

[73] Assignee: Murata Manufacturing Co., Ltd., Nagaokakyo, Japan

[21] Appl. No.: 618,123

[22] Filed: Jun. 7, 1984

[30] Foreign Application Priority Data

Jun. 8, 1983 [JP] Japan ................................ 58-103271

[51] Int. Cl.[4] ........................................... B32B 27/00

[52] U.S. Cl. .................................... 428/334; 428/421; 428/422; 428/457; 428/458; 428/474.4

[58] Field of Search ............... 428/421, 422, 457, 458, 428/474.4, 334; 252/387, 388, 390

[56] References Cited

PUBLICATIONS

Charles A. Harper, "An Improved Materials System for Maintaining High Resistivity of Electrical Insulation in Humid Environments" (Westinghouse Electrical Corporation, Baltimore, Maryland).

*Primary Examiner*—Marion E. McCamish
*Attorney, Agent, or Firm*—Finnegan, Henderson, Farabow, Garrett & Dunner

[57] ABSTRACT

A corrosion inhibiting coating for a metal surface, especially useful for electrical conductors, where the surface of the metal is covered with an organic corrosion inhibitor and an exterior layer of an inactive fluoric material thereon.

7 Claims, 2 Drawing Figures

CORROSION INHIBITING COATING COMPRISING LAYER OF ORGANIC CORROSION INHIBITOR AND LAYER OF FLUORIDIZED ACRYLATE

BACKGROUND OF THE INVENTION

1. Field of the Invention

The invention relates to coatings for metal objects that inhibit corrosion and other detrimental, environmentally induced degradation of the metal object.

2. Description of the Prior Art

Metals such as copper, iron, silver, aluminum, tin, zinc, and their alloys are susceptible to corrosion if subjected to air, water or a solvent or the like. For prevention of such corrosion, attempts have been made to use, for instance, organic inhibitors such as benzotriazole or organic paints such as epoxy resin, acrylic resin and the like.

Use of an organic inhibitor such as benzotriazole on the metal surface has the shortcomings that it is partially dissolved by water, substantially solved in an acid or alkali, and evaporated at a high temperature as, for example, 80° C. This will not prevent the metal surface from corroding over long periods of time.

On the other hand, if organic paint is used, it fails to make electric contact with metal due to it being an electrical insulator and having a high contact resistance. Moreover, the organic paint is apt to have pin holes so that localized corrosion develops through such pin holes. If the organic paint is subjected to a thermal shock, differential thermal expansion and contraction in relation to the metal causes deterioration of the bonding with the metal and loss of adhesion.

For example, a conventional ceramic dielectric resonator formed with a copper coating as inner and outer conductors is depicted in cross section in FIG. 1. The main body 1 of the ceramic dielectric resonator is formed of, for example, $TiO_2$ ceramic dielectric in a cylindrical form. Inner and outer conductors (2 and 3 respectively) are formed in the inner and outer surfaces of the cylindrical main body 1. A connecting conductor 4 couples the inner conductor 2 to the outer conductor 3. A spring-like outer terminal 5 is fixed to the main body 1 by inserting and holding its spring portion in the opening of the main body. The resonator as shown constitutes a $\frac{1}{4}$ wavelength coaxial resonator. The inner and outer conductors 2, 3 and the connecting conductor 4 are formed of a layer of copper produced by electroless plating.

The application of a benzotriazole film to the copper coating to form a corrosion protective coating was not entirely successful when the device was tested. The change in the Q value for such a device was more than 10% if the device was exposed for more than 1000 hours at a temperature of 80° C., and a relative humidity of 85%.

The organic paint when used resulted in a bonding between the copper coating and the paint and between the other conductor 5 and the paint. When this combination was subjected to a hundred heat cycle test, each including a step for maintain the device at a temperature of −40° C. for 30 min. and then for maintain the device at a temperature of 80° C. for 30 min., the bond between the main body 1 and the copper coating deteriorated. The resonant frequency of a 800 MHz device changed in frequency more than 100 KHz. Exfoliation of the copper coating from the main body 1 was also observed. Application of the organic inhibitor or organic paint to the copper coating on the surface of the ceramic dielectric resonator has heretofore resulted in insufficient corrosion protection.

It is, therefore, an object of the invention to provide a metal corrosion protective coating for metals such as copper, iron, silver, aluminum, tin, zinc, a copper-zinc-tin alloy, a tin-zinc alloy, and the like.

Other objects and advantages of the invention will be apparent from the description of the preferred embodiments or may be learned form the practice of the invention.

SUMMARY OF THE INVENTION

The present invention overcomes the problems and disadvantages of the prior art by providing a corrosion inhibiting coating for a metal surface having a layer of an organic corrosion inhibitor on that surface. A second layer over the organic corrosion inhibitor is an inactive fluoric material.

Preferably, the organic corrosion inhibitor is selected from the group consisting of: a benzotriazole derivative, cyclohexylamine, aniline, benzylamine, N-cyclohexyl-n-dodecylamine, piperidine and di-n-butylamine. It is further preferred that the inactive fluoric material be a fluoridized acrylate.

DESCRIPTION OF THE PREFERRED EMBODIMENTS

The invention is contemplated to provide a coating for protecting the surface of a metal from corrosion. More specifically, the invention provides a metal corrosion protective material which is comprised of an organic inhibitor coating on the metal surface and an inactive fluoric coating thereon.

Metals to which the invention may be applicable are those such as copper, iron, silver, aluminum, tin, zinc and the like, or a copper-zinc-tin alloy, a tin-lead alloy and combinations of these. Those to be protected according to the invention are not just the surface of metal objects but also metal coatings such as those formed by a wet plating process such as electroless plating, or layers formed from metal paste and dry platings such as vacuum evaporation, sputtering and ion plating or the like.

The organic inhibitors to be formed on the metal surface are, for example, benzotriazole derivatives, cyclohexylamine, aniline, benzylamine, N-cyclohexyl-n-dodecylamine, piperidine, di-n-butylamine and the like. The inactive fluoric coating films formed on the organic inhibitor are those such as a fluoridized acrylate composition, for example, "JX-900" (Trade Name) and "Fluorad FC-721" (Trade Name) manufactured by Minnesota Mining & Mfg. Co.

The film thickness of each layer (the organic inhibitor and the inactive fluoric coating) should be sufficient to prevent the metal from corroding. The thickness of the organic inhibitor (the first layer) is sufficient if it serves as an absorptive layer disposed on the metal surface.

The inactive fluoric coating preferably has a thickness on the order of 0.1 to 10 μm.

The metal corrosion protective coating according to the invention may obtain the following effects:

1. The metal does not show a decrease in electric conductivity even if it is subjected to a high temperature and a high humidity.

2. No exfoliation of a metal plated ceramic is experienced even if it is subjected to repeated thermal shocks.

3. The coated metal is moisture repellant, heat resistive, and corrosion resistive.

4. Since the coating itself is thin and unhardened, the coating may be removed when a lead wire is soldered to the metal surface. This will allow the lead wire to establish an electrical contact.

5. The coating itself is very thin and unhardened and this facilitates making an electrical contact when a pressure contact is made.

6. The coating, which is very thin and unhardened, does not induce strain on either the coating or the metal.

Now, the invention will be fully explained in conjunction with examples referred to hereinafter.

EXAMPLE 1

Figure 1:
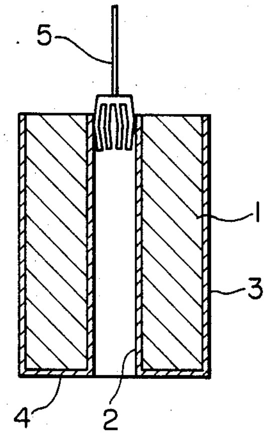
FIG. 1 is a cross-sectional view of a ceramic dielectric resonator for illustrating the background of the invention.

A ceramic dielectric resonator of the type depicted in FIG. 1, having a surface covered with an electroless copper plating, was formed in accordance with the invention.

The copper surface was coated by adding 2% of "Litepal C" (Trade Name) manufactured by Kyoeisha Oil and Fat Industry Co. as a polyamine derivative of benzotriazole to "Freon TF" (Trade Name) manufactured by Mitsi Fluorochemical Co., Ltd. to form an azeotropic mixture of trichlorotrifluoroethane and ethanol. The resonator was immersed therein. Spraying, brushing or painting as well as immersion might be employed.

Thereafter, the resonator was taken out of the solution and dried at room temperature. At this stage, the film produced from the polyamine derivative of benzotriazole was formed on the surface of the copper coated resonator. The azetropic solution of "Freon" and alcohol was, of course, evaporated at room temperature and left no residue.

Subsequently, "Fluorad FC-721" (Trade Name) as a fluoric coating agent manufactured by Minnesota Mining & Mfg. Co. and "Freon TF" (Trade Name) as a trichlorotifluoroethane solvent manufactured by Mitsi Fluorochemical Co., Ltd. were mixed 1:1 (weight ratio) to obtain a liquid mixture. The resonator, to which a polyamine derivative of benzotriazole as the organic inhibitor was applied, was immersed in this mixture. The resonator was then taken out of the mixture and air dried at room temperature.

The following test was carried out with the ceramic dielectric resonator as processed in a manner disclosed above.

The changes in the contact resistance value and the Q value were +1.5% and −0.5%, respectively for the resonator after it was left at a temperature of 85° C. and a relative humidity of 85% for 1000 hours.

For comparison, the same test was carried out with the same article whose surface was coated with benzotriazole to show the rates of change in contact resistant value and the Q value were +29.8% and −6.3%, respectively. Next, a thermal shock test was conducted upon the resonator in such a manner that it was subjected, after having left at a temperature of −40° C. for 30 min., to hundred cycles each including a step of maintaining the same at a temperature of +80° C. for 30 min. to result in a change in a resonance frequency (8000 MHz) of only +10.5 KHz. This same test was also conducted on the same article coated with acryl resin with film thickness of 20–30 μm. The resonant frequency was changed by +525 KHz.

The copper coating of the ceramic dielectric resonator of such corrosion protective structure according to the invention was soldered by the lead wire to prove connective with sufficient adhesive strength.

Figure 2:
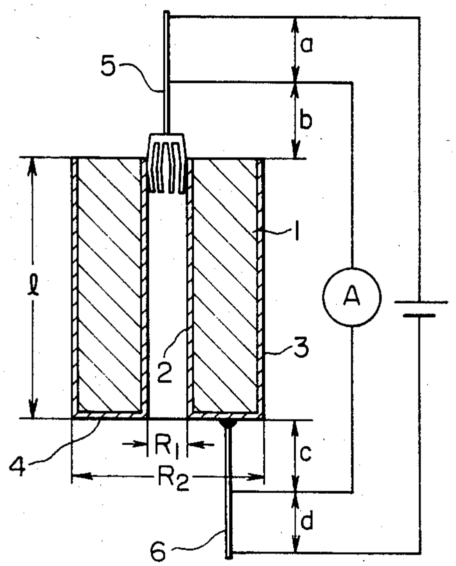
FIG. 2 is a schematic representation showing the manner in which the change in contact resistance is measured.

As shown in FIG. 2, the specimens tested had dimensions of 1–20 mm, $R_1=3.5$ mm, $R_2=10$ mm, a=b=c=d=10 mm. On the other hand, the terminals 5, 6 were connected to an ohmmeter from which a change in contact resistance between the terminal and the inner conductor 2 was read. The resultant measurements were all average values of 10 specimens.

EXAMPLE 2

The corrosion protective coating was placed on the surface of each of several metals and alloys to be tested. Such materials included iron, silver, aluminum, tin, zinc, copper, a copper-zinc-tin alloy (brass), and a lead-tin alloy (solder). The metal samples were coated in the same manner as described in Example 1.

The change in the contact resistance value shown in the following table was obtained by measuring each metal after it was exposed to a temperature of 85° C. at a relative humidity of 85% for 1000 hours in the same manner as in Example 1.

The same test was conducted on metals having a corrosion protective coating of benzotriazole according to the prior art. These test results are also shown in the following table. The reported measurements were all average values of 10 specimens.

TABLE

| Specimen | Fe | Ag | Al | Sn | Zn | Cu—Zn—Sn Alloy | Pb—Sn Alloy |
|---|---|---|---|---|---|---|---|
| Invention | +2.1% | +0.1% | +0.5% | +0.4% | +1.6% | +0.8% | +0.2% |
| Prior Art | +346% | +2.9% | +10.6% | +70% | +150% | +58% | +5.4% |

EXAMPLE 3

This example relates to a test carried out on a metal coating formed by heating a copper paste.

Initially, a copper paste was made by mixing and kneading powdered copper, borosilicate glass frit and an organic vehicle with one another. The copper paste was then screen printed on an alumina substrate and subjected to a baking treatment in oxygen at a temperature of 800° C. for 30 min. to form a conductive pattern with a film thickness of 20–25 μm. The material had a sheet resistance of 2 mΩ/□.

The surface of the conductive pattern was processed in the same manner as in Example 1 to provide a corrosion protective coating thereon. The change in the surface resistance value was +0.15% after it was left at a temperature of 85° C. and a relative humidity of 85% for 1000 hours.

For the conductive pattern, the change in surface resistance value was +25.3% in comparison to the same device having a corrosion protective coating of benzotriazole.

What is claimed is:

1. A corrision inhibiting coating for a metal surface, said coating comprising: a layer of an organic corrosion inhibitor on said surface and a layer of a material comprised of fluoridized acrylate on said organic layer.

2. The corrosion inhibiting coating of claim 1 wherein said organic corrosion inhibitor is selected from the group consisting of: a benzotriazole derivative, cyclohexylamine aniline, benzylamine, N-cyclohexyl-n-dodecylamine, piperidine and di-n-butylamine.

3. the corrosion inhibiting coating of claim 1 wherein said layer of fluoridized acrylate has a thickness in the range of from about 0.1 to 10 μm.

4. A corroison inhibiting system for metals comprising:

a metal surface;

a layer of an organic corrosion inhibitor on the metal surface; and a layer of a material comprised of fluoridized acrylate on the layer of the organic corrosion inhibitor.

5. The corrosion inhibiting system of claim 4 wherein said metal surface is selected from the group consisting of copper, iron, silver, aluminum, tin, zinc, a copper-zinc-tin alloy, and a lead-tin alloy.

6. The corrosion inhibiting system of claim 4 wherein said organic corrosion inhibitor is selected from the group consisting of a benazatriazole derivative, cyclohexylamine, aniline, benzylamine, N-cyclohenxyl-n-dodecylamine, piperidine and di-n-butylamine.

7. The corrosion inhibiting system of claim 4 wherein said layer of a fluoridized acrylate has a thickness in the range of from about 0/1 to about 10 μm.

* * * * *